United States Patent [19]
Briese

[11] 4,322,189
[45] Mar. 30, 1982

[54] COOLANT CONTROL FOR MILLING TOOLS

[76] Inventor: Leonard A. Briese, 5039 Browndeer La., Rancho Palos Verdes, Calif. 90274

[21] Appl. No.: 129,905

[22] Filed: Mar. 13, 1980

[51] Int. Cl.³ .............................................. B23C 9/00
[52] U.S. Cl. .................... 409/136; 407/11; 408/59
[58] Field of Search ............... 409/136, 135; 407/11; 408/56, 59, 60

[56] References Cited

U.S. PATENT DOCUMENTS

| 2,080,401 | 5/1937 | Heard | 407/11 |
|---|---|---|---|
| 3,028,772 | 4/1962 | Mossberg | 408/59 |
| 3,370,489 | 2/1968 | Andreasson | 408/60 |
| 4,032,250 | 6/1977 | Lavallee | 409/136 X |

FOREIGN PATENT DOCUMENTS

| 2817931 | 10/1978 | Fed. Rep. of Germany | 408/59 |
|---|---|---|---|
| 2336592 | 2/1974 | France | 408/59 |
| 602314 | 4/1978 | U.S.S.R. | 408/59 |
| 647071 | 2/1979 | U.S.S.R. | 408/59 |
| 636855 | 12/1979 | U.S.S.R. | 409/136 |

Primary Examiner—William R. Briggs
Attorney, Agent, or Firm—Eric T. S. Chung

[57] ABSTRACT

A coolant flow control system for milling tools is disclosed. The flow control system is characterized by a flow guide plate that is adapted to be secured to the central base portion of a milling tool to guide coolant provided from a center-feed coolant system towards the cutting inserts of the milling tool.

13 Claims, 8 Drawing Figures

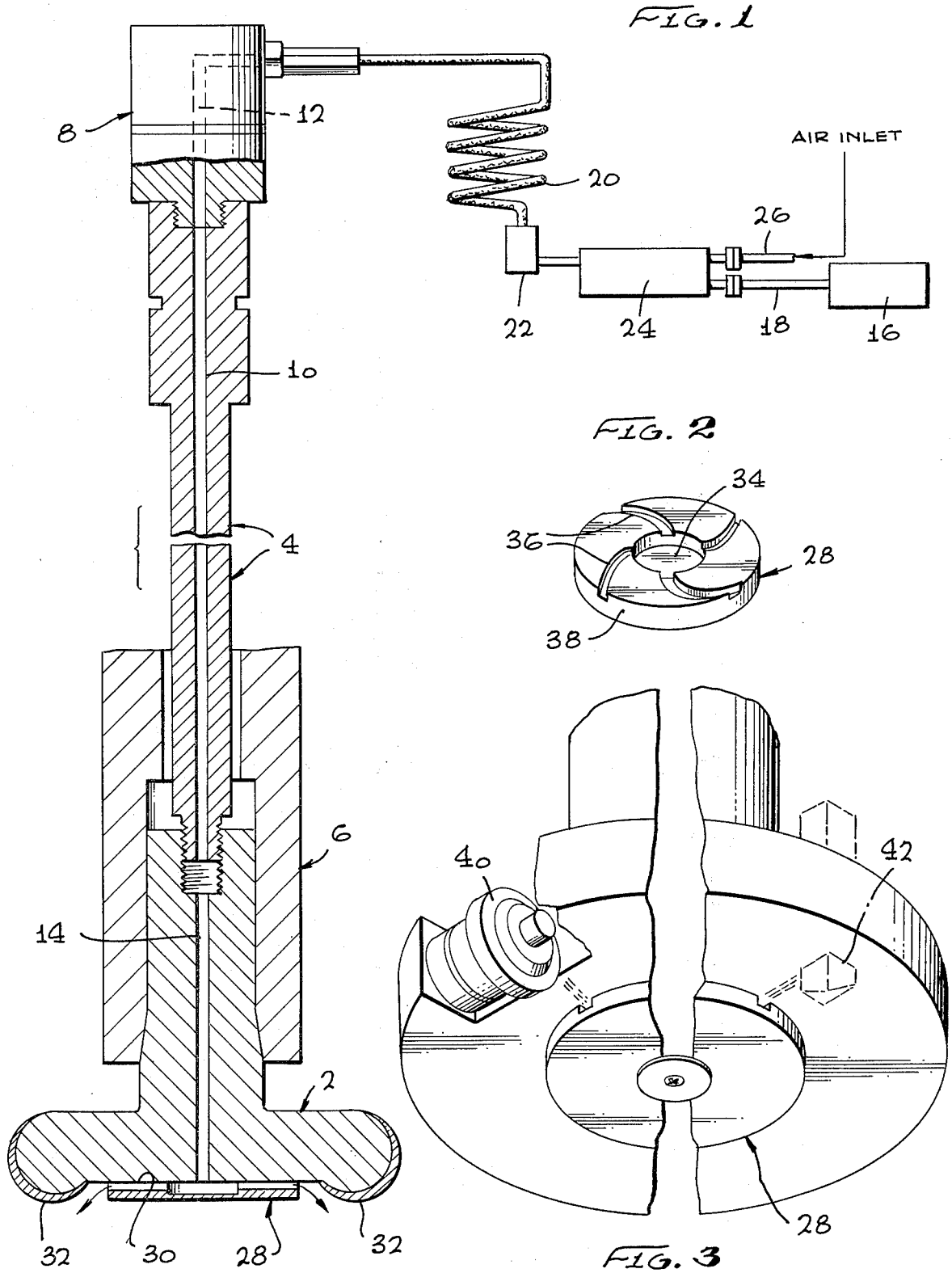

COOLANT CONTROL FOR MILLING TOOLS

BACKGROUND OF THE INVENTION

1. Field of the Invention

The present invention is directed to cooling systems for milling tools. More particularly, the present invention concerns a coolant flow control system that may be readily used with, or to modify, a variety of milling tools for the purpose of efficiently and accurately directing coolant towards the cutting inserts of a milling tool.

2. Description of the Prior Art

Standard cooling systems for milling machines simply involve coolant being directed out of a nozzle towards a milling tool and the area of a workpiece being milled. The coolant is usually pumped from a reservoir or other catchment via a valve control system and connecting hoses.

Where a milling machine is equipped with a center-feed cooling system, the drawbar and rotating union used on the machine are provided with a central duct through which coolant can be fed to a milling tool adapted to be used with such a system. Otherwise, the coolant is normally fed out of a single nozzle that is used to flood the area of the milling tool.

Whenever a single nozzle is used the nozzle is usually clamped in a stationary position and pointed in the direction of the milling tool. When so positioned, the coolant is continually washed over the machine tool from a single direction. Such a mode of operation has the obvious drawback of having metallic chips and particles resulting from the metal working or milling operation washed into the work area and toward the machine tool rather than away from the work area.

Further, the use of a single nozzle to apply coolant to a work area has the disadvantage that the resulting cooling is inefficient in that coolant is not continually applied to a cutting insert, but rather, only cyclically as the insert passes the nozzle from which coolant is sprayed.

OBJECTS AND SUMMARY OF THE INVENTION

It is accordingly a primary object of the present invention to provide a coolant flow control system that efficiently and accurately directs and distributes coolant towards the cutting inserts of a milling tool to have the coolant efficiently cool the cutting members of the milling tool.

It is another object of the present invention to provide a coolant flow control system wherein coolant is applied to a milling tool and work area in a fashion that allows metal particles to be washed away from the work area.

It is a further object of the present invention to provide a coolant flow control system whereby standard milling tools can be readily modified for use with a center-feed coolant system.

More particularly, the coolant flow control system, in accordance with the present invention, includes a coolant flow guide plate which is adapted to be attached to a central base portion of a milling tool to communicate with an axial duct therein through which coolant is fed. The flow guide plate is designed to have its upper face etched to form a central receiving chamber and a plurality of spiral channels through which coolant is directed outwardly towards the cutting inserts of a milling tool.

Further objects and the many attendant advantages of the invention may be best understood by reference to the following detailed description taken in conjunction with the accompanying drawings in which like reference symbols designate like parts through out the figures thereof.

BRIEF DESCRIPTION OF THE DRAWINGS

FIG. 1 is a schematic diagram illustrating a side view of a machine tool system that is equipped with a modified milling tool in accordance with the present invention.

FIG. 2 is a top perspective view of a coolant flow guide plate in accordance with the present invention.

FIG. 3 is a partially-fragmented, perspective view of the underside of milling tools provided with a coolant flow guide plate in accordance with the present invention.

DESCRIPTION OF THE PREFERRED EMBODIMENT

Figure 4:
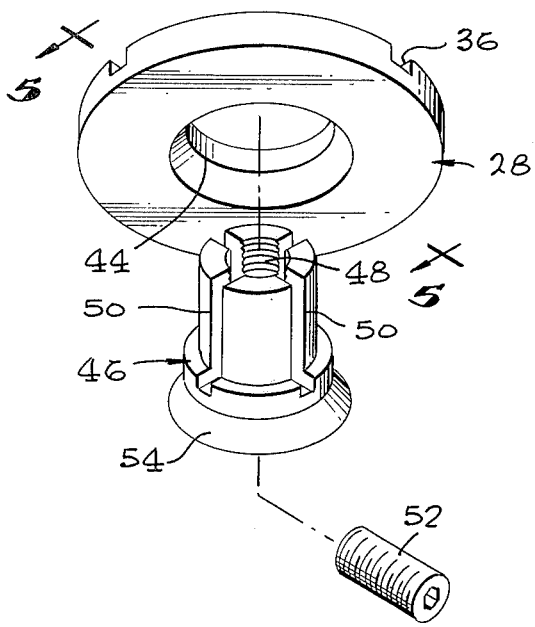
FIG. 4 is an exploded perspective view of a preferred embodiment of a coolant flow guide plate in accordance with the present invention.

Referring to FIG. 1 of the drawings, a milling tool 2 is shown operatively connected to a conventional milling machine by being threaded onto a drawbar 4 and supported thereon by a conventional machine spindle 6. The drawbar 4 is itself threaded at its upper end onto a rotating union 8.

The drawbar 4 and rotating union 8 are respectively provided with a central duct 10 and 12 which serve to feed coolant to a central duct 14 of the milling tool 2 provided at the longitudinal axis thereof. The duct 14 of the milling tool 2 communicates with the central duct 10 of the drawbar 4 when connected thereto.

Coolant is fed to the center-feed coolant system from a reservoir or catchment 16 via hoses 18 and 20 and a flow control valve 22. A filter 24 may be used by being connected in the fluid stream. A source of air may be connected to the control valve 22 through the filter 24 via an appropriate coupling 26.

When a source of air is used in conjunction with a coolant system the control valve 22 may serve to provide one of three modes of operation. Specifically, the control valve 22 may be operated to provide only coolant through the ducts 10 and 12 to the milling tool 2, or provide a stream of air, or provide a mist formed by a predetermined combination of air and coolant.

As shown in FIG. 1, the milling tool 2 is provided with a coolant flow guide plate 28 which is attached to the central base portion 30 of the milling tool 2 for the purpose of distributing coolant in the direction of cutting inserts 32 from a center point of the milling tool. Coolant is thereby generally directed away from the work area.

Referring to FIG. 2, a coolant flow guide plate 28 is formed by a rubber disk having etched or otherwise formed thereon, in one face thereof, a central receiving chamber 34 and a plurality of spiral channels 36 leading from the central receiving chamber 34 to the periphery 38 of the coolant flow guide plate 28. When the coolant flow guide plate 28 is attached to the base 30 of the milling tool 2, coolant fed through the central duct 14 is received in the central receiving chamber 34 and fed outward through the channels 36 to be spewed outwardly from the center of the base of the milling tool 2. When the channels 36 are aligned slightly in advance of the cutting inserts 32, the coolant so distributed serves to continually cool the cutting inserts and additionally wash particles formed during the milling operation away from the milling tool as the process of milling continues.

Referring to FIG. 3, it is to be understood that a coolant flow guide plate 28, in accordance with the present invention, may be used with milling tools of either the rotary cutting type including rotary cutting inserts 40 or conventional cutting inserts 42. In either instance, the direction of the coolant being dispensed through the spiral channels 36 can be optimally directed to provide maximum cooling by simply having the coolant flow guide plate 28 rotated about the center axis thereof to be positioned in accordance with the speed at which the milling tool is operated. For example, the faster the speed of rotation, the less lead is required in the relative position of each spiral channel relative to the position of a cutting insert being cooled by coolant being dispensed.

Figure 5:
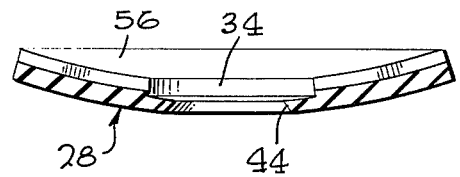
FIG. 5 is a cross-sectional side view of a coolant flow guide plate in accordance with the present invention.
Figure 6:
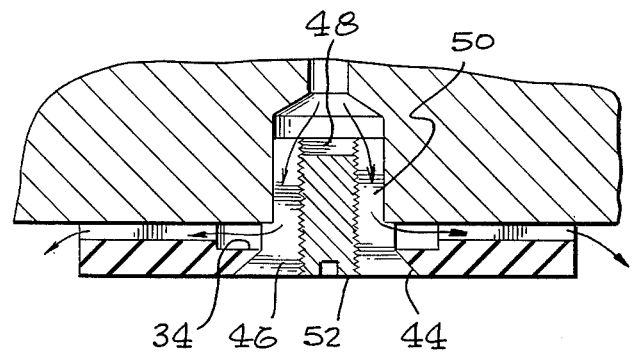
FIG. 6 is a cross-sectional side view of the coolant flow guide plate shown in FIG. 5 when assembled on a milling tool in accordance with the present invention.

Referring now to FIGS. 4, 5 and 6, a means by which an adjustable flow guide plate 28 is provided is illustrated. As shown in FIG. 4, the central receiving chamber 34 is provided with a central aperture 44 extending through to the opposite face of the coolant flow guide plate 28. The aperture 44 is sized to receive an expansion bushing 46 having a central duct 48 and a plurality of expansion slots 50 which also serve to permit coolant to be fed therethrough to the receiving chamber 34 of the coolant flow guide plate 28. An expansion set screw 52 is intended to be threaded in the central duct 48 by the use of interior threads provided for such purpose.

It is to be understood that the central duct 14 of the milling tool 2 may be machined to receive the leading end of the expansion bushing 46 such that the expansion created by insertion of the expansion set screw 52 will secure the bushing 46 and the coolant flow guide plate 28 to the base of the milling tool 2. The bushing 46 may be provided with a flared head portion 54 and the coolant flow guide 28 shaped to accommodate the same to provide a fluid seal therebetween.

As shown by FIG. 5, the coolant guide plate 28 may be fabricated to have a concave configuration such that the upper surfaces 56 are maintained in close contact with the continuous surface of the base portion of the milling tool 2 and thereby provide a desired fluid seal when the coolant flow guide plate 28 is assembled on a milling tool 2.

Figure 7:
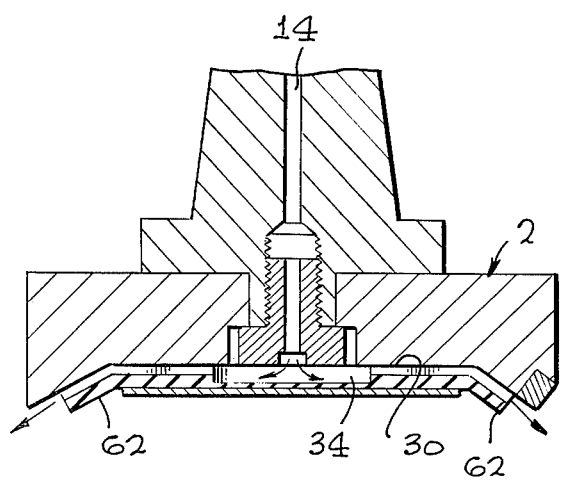
FIG. 7 is a cross-sectional side view of an alternate embodiment of the present invention.
Figure 8:
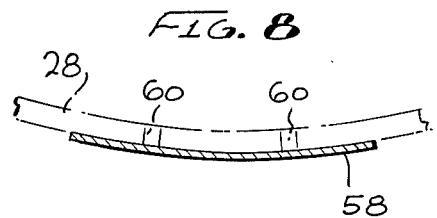
FIG. 8 is a cross-sectional side view of the flow guide plate shown in FIG. 7 when in an unassembled condition.

Referring now to FIGS. 7 and 8, another embodiment of a coolant flow guide plate is illustrated in accordance with the present invention. As shown in FIG. 8, the coolant flow guide plate 28 adapted to be used with a conventional milling tool may be bonded to a metal pressure plate 58. The pressure plate 58 may be provided with a pair of screw holes 60 to permit attachment to the base 30 of a milling tool 2. The outer diameter of the pressure plate 58 is sized to be compatible with the dimension of the flat area of the base 30 such that when attached thereto the edges 62 of the coolant flow guide plate 28 will be forced downwardly into a conforming configuration with the base 30 of the milling tool 2 as shown in FIG. 7.

As previously explained, the slightly concave configuration of the coolant flow guide plate and the pressure plate 58, bonded thereto, serve to provide a desired tight fluid seal.

From the foregoing description it is now clear that the present invention provides a simple but effective coolant flow control system for milling tools used with a milling machine equipped with a center-feed coolant system. In the event that a milling tool is not provided with a central duct when manufactured, it is a simple matter to bore or drill a central duct 14 along the longitudinal axis thereof such that a milling tool can be equipped with a coolant flow guide plate in accordance with the present invention.

The foregoing description of the present invention concerns the preferred embodiments that have been developed to date. It is not intended to be limiting with respect to the broad principles involved herein. Further, while a preferred embodiment of the present invention has been described hereinabove it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A coolant flow control system for milling tools adapted to be used on milling machines having a center-feed coolant system and a drawbar having a central longitudinal duct through which coolant may be provided, said milling tools characterized by having an axial duct and cutting inserts mounted thereon, said coolant flow control system comprising:

flow plate means for redirecting coolant piped through said axial duct of a milling tool to cool cutting inserts mounted thereon, said flow plate means being adapted to be mounted on the base underside of a milling tool adjacent cutting inserts to be cooled, said flow plate means comprising a disk having formed on one face thereof, a central receiving chamber and a plurality of spiral channels extending from said central receiving chamber to the peripheral edge of said disk.

2. The coolant flow control system defined by claim 1, said disk being a flexible material.

3. The coolant flow control system defined by claim 1, said disk being fastened to the base underside of said milling tool with the central receiving chamber communicating with said axial duct, the end of at least one spiral channel being adjacent to each cutting insert mounted on said milling tool to have coolant directed towards each said cutting insert.

4. The coolant flow control system defined by claim 3, said flow plate means further including a central aperture extending through the center of said disk and into said central receiving chamber, the diameter of said central receiving chamber being greater than the diameter of said aperture.

5. The coolant flow control system defined by claim 4, further including:

bushing means for securing said flow plate means to said milling tool, said bushing means being expandable by having a plurality of expansion slots longitudinally extending for a portion of the length of said bushing, said bushing being adapted to extend through said central aperture of said disk and into said milling tool; and expansion means for causing said bushing means to be expanded, whereby said flow plate means is secured to said milling tool.

6. The coolant flow control system defined by claim 4, wherein said disk is concave and said central receiving chamber and said spiral channels are formed on the concave face of said disk.

7. The coolant flow control system defined by claim 3, further including:

spring plate means for causing said disk to have a concave configuration wherein said central receiving chamber and said spiral channels are situated on said concave surface of said disk.

8. The coolant flow control system defined by claim 7, said spring plate means being bonded to said disk to form an exterior surface when said flow plate means is fastened to a milling tool.

9. A coolant flow guide for a milling tool adapted to be used on milling machines equipped with center-feed coolant systems, said milling tool having cutting inserts thereon and an axial bore extending through the milling tool, said flow guide including:

guide plate means for guiding coolant towards cutting inserts of a milling tool, said guide plate means having a central receiving chamber and a plurality of spiral channels extending from said central receiving chamber to the periphery of said guide plate means, said guide plate means being adapted to be secured to the base of a milling tool adjacent said cutting inserts.

10. The coolant flow guide defined by claim 9, wherein said guide plate means is disk-shaped.

11. The coolant flow guide defined by claim 9, wherein said guide plate means is concave, said central receiving chamber and said spiral channels being on the concave surface of said guide plate means.

12. The coolant flow guide defined by claim 9, further including:

spring plate means for causing said guide plate means to have a concave shape, wherein said central receiving chamber and said spiral channels are on the concave surface of said guide plate means.

13. The coolant flow guide defined by claim 12, wherein said spring plate means is secured to the convex surface of said guide plate means.

* * * * *